United States Patent [19]
Weil

[11] 3,891,727
[45] June 24, 1975

[54] FIRE RETARDANT PHOSPHORUS OLIGOMER COMPOSITIONS

[75] Inventor: Edward D. Weil, Hastings-on-Hudson, N.Y.

[73] Assignee: Stauffer Chemical Company, Westport, Conn.

[22] Filed: Dec. 17, 1973

[21] Appl. No.: 425,675

Related U.S. Application Data

[63] Continuation of Ser. Nos. 153,075, June 14, 1971, Pat. No. 3,822,327, Ser. No. 187,575, Oct. 7, 1971, and Ser. No. 410,583, Oct. 29, 1973.

[52] U.S. Cl. ....... 260/928; 260/2.5 AJ; 260/45.7 P; 260/927 R; 260/978; 260/983
[51] Int. Cl.... C07f 9/08; C07d 105/04; C08f 45/58
[58] Field of Search..................... 260/928, 983, 978

[56] References Cited
UNITED STATES PATENTS
3,391,226  7/1968  Birum et al..................... 260/928 X Primary Examiner—Anton H. Sutto

[57] ABSTRACT

Fire-retardant phosphorus oligomers having —O—C—C—O— linkages between phosphorus atoms are formed by condensation of β-haloalkyl esters of pentavalent phosphorus acids. These condensates contain cyclic 5-membered phosphorus esters whose rings can be opened by reaction with water or an alcohol. By choice of the appropriate OH-containing reactant, desired endgroup functionality can be imparted to the condensate product.

34 Claims, No Drawings

FIRE RETARDANT PHOSPHORUS OLIGOMER COMPOSITIONS

This is a continuation-in-part of copending applications Ser. No. 153,075, filed June 14, 1971 issued as U.S. Pat. No. 3,822,327 on July 2, 1974, Ser. No. 187,575, filed Oct. 7, 1971, and Ser. No. 410,583, filed Oct. 29, 1973.

This invention relates to phosphorus containing oligomers having —O—C—C—O— linkages between phosphorus atoms, said oligomers obtained from the condensation of β-haloalkyl esters of pentavalent phosphorus acids. More particularly, the invention concerns a process for controlling the properties of said oligomers as to their functionality, stability, viscosity, etc. The oligomers themselves are distinguished by their having excellent fire retardant properties.

The preparation of polycondensed oligomeric phosphates by heating of tris(2-haloalkyl)phosphates is described in U.S. Pat. No. 3,513,644. It is also known to prepare oligomeric polycondensed phosphonates from bis(2-haloalkyl) vinylphosphonates as described in U.S. Pat. No. 3,641,202. Applicant has also described in his copending applications Ser. No. 187,575 filed Oct. 7, 1971 and application Ser. No. 410,583 filed Oct. 29, 1973 the copolycondensation of certain phosphates and phosphonates having a 2-haloalkyl group on at least one of these reactants. The polycondensation products all have in common the presence of at least one linkage of the type

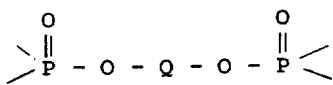

wherein the P—O linkages are attached to adjacent (vicinal) carbon atoms of an alkylene radical (Q) containing from 2 to 20 carbon atoms. These products, as originally made in the polycondensation reaction, also contain two types of side reaction products; namely, true acid groups of the type

>P(O)OH (currently believed to be formed by cracking, i.e., elimination, reactions) and cyclic five-membered phosphorus ester rings of the type:

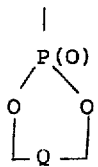

wherein Q represents vicinal carbon atoms of an alkylene radical containing from 2 to 20 carbon atoms and wherein the phosphorus is of the phosphate or phosphonate type. Hereinafter, such rings are referred to as "five-membered phosphorus ester rings". Both the acid groups and the five-membered phosphorus ester rings tend to be deleterious to the properties of the polycondensation products when used as flame retardants. The five-membered phosphorus ester rings undergo very rapid hydrolysis by water and produce true acid structures, i.e.,

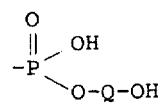

wherein Q is a defined above. Such acid structures in polymer or textile systems constitute a serious impediment to the successful use of the polycondensation products as flame retardants. For example, in urethane foam applications, acids prevent the normal functioning of the amine catalysts used in the foaming reaction and the foam does not rise, or has improper cell size, or is tacky and weak. In polyester resins, phosphorus acids interfere with the cobalt catalysts used in curing and cause excessively long cure times. In melamine-formaldehyde resins, acids can cause premature gelation. On paper or cotton, acids can cause embrittlement, weakening, and/or discoloration of the cellulose. In polyester thermoplastics, acids cause degradation of molecular weight, and reduced strength. For reasons such as those given, it is highly desirable for most flame retardant applications to eliminate both the true acid groups and the five-membered phosphorus ester rings.

Means have heretofore been known for eliminating the true acid groups i.e. the P(O)(OH) groups by neutralizing such groups using an alkylating agent such as an oxirane (epoxide). Such techniques are described, for example, in U.S. Pat. No. 3,641,202. The other problem, that of the cyclic esters, seems to have been heretofore unrecognized in the art and efficient means for eliminating the cyclic esters have therefore not been heretofore described. One possible reason for this may be that the common ASTM-type titration of acid by alcoholic base in alcoholic medium does not detect nor measure the content of five-membered phosphorus rings in polycondensation products. By contrast, the applicant conducts a titration by base in an aqueous medium and has found that after a brief waiting time of a few minutes, these cyclic esters manifest themselves as acid and may be quantitatively titrated. Indeed, an excellent way of assaying the cyclic esters is to determine the total acid content in water after a brief waiting to allow hydrolysis of the cyclic esters to complete itself) and separately, to determine the true acid(originally present) by titration in alcohol. The cyclic ester content is then computed by subtracting the alcoholic titration figure from the aqueous titration figure. An alternative means of assaying for cyclic five-membered phosphorus esters is by 31P nuclear magnetic resonance, whereby the cyclic five-membered ester gives a signal shifted about 15 ppm. downfield from non-cyclic or larger ring (stable) phosphorus esters.

The prior art method of neutralizing phosphorus-containing polycondensation products, using epoxides is efficient for the removal of the true acid structures but only very slowly and incompletely reduces the cyclic five-membered phosphorus ester structures. Indeed, it appears very unlikely that the epoxides react in a simple stoichiometric fashion with the cyclic five-membered phosphorus ester structures; more likely, whatever reduction of the content of these structures which does occur by introduction of an epoxide is the result of an induced polymerization or oligomerization, the evidence being that a very large increase in viscosity occurs in such a process. Therefore, the prior art method of neutralizing polycondensed phosphorus esters is found to be faulty not only because of the slow and incomplete removal of the unstable five-membered cyclic phosphorus esters but because of the accompaning viscosity increase which can extend all the way to gelation in extreme cases.

Accordingly, it is an object of the present invention to provide means for neutralizing polycondensed phosphorus esters.

It is another object of this invention to provide means for eliminating five-membered phosphorus ester rings from polycondensed phosphorus esters.

It is still another object of the present invention to impart desired end-group functionality to the polycondensed phosphorus esters by appropriate choice of OH-containing reactants employed in opening the five-membered phosphorus ester rings.

It is a still further object of this invention to provide phosphorus containing oligomers exhibiting excellent fire retardant properties and means for controlling the functionality, stability and viscosity thereof.

These as well as other objects are accomplished by the present invention which provides condensation products of a phosphorus ester material comprising a phosphorus ester of the formula:

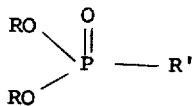

wherein R is 2-haloalkyl of 2 to 20 carbon atoms or hydrocarbyl or

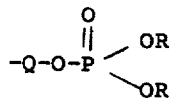

wherein Q represents vicinal carbon atoms of an alkylene radical containing from 2 to 20 carbon atoms, and R' is R or OR, with the proviso that at least one R in the above formula is a 2-haloalkyl radical, said condensation products being essentially free of five-membered phosphorus ester rings and being prepared by a process comprising heating said phosphorus ester material, removing alkyl halide, forming:

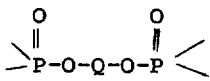

linkages wherein Q is as defined above, and five membered phosphorus ester rings, and converting said rings to open chain phosphorus esters by reaction with a reagent of the formula:

YOH in which Y is hydrogen, alkyl of from 1 to 20 carbon atoms or alkyl substituted with aryloxy, halogen, alkoxy, alkenyl, aryl, acyl, acyloxy, hydroxyl, amide, alkylthio, arylthio, carbalkoxy, carboxamide, cyano or nitro.

The phosphorus-containing oligomers which can be treated by the process of this invention are homo- and co-polycondensation products of a phosphorus ester material comprising at least one phosphorus ester of the formula:

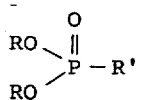

wherein R is a 2-haloalkyl of 2 to 20 carbon atoms or hydrocarbyl or

wherein Q represents vicinal carbon atoms of an alkylene radical of 2 to 20 carbon atoms, and wherein R' is OR or R, with the proviso that at least one R in the above formula is a 2-haloalkyl radical, prepared by a condensation reaction which comprises heating the ester or esters to give off volatile alkyl halide and form the oligomeric condensation products.

In the above formula, R can be a 2-haloalkyl of 2 to 20 carbon atoms. The halo substituent can be either chlorine or bromine. Typical of such 2-haloalkyls are 2-chloroethyl, β-chloroisopropyl, β,β'-dichloroisopropyl, 2,3-dibromo-npropyl and the like. Preferably, the 2-haloalkyl is 2-chloroethyl. R can also be any hydrocarbyl radical as hereinafter defined or

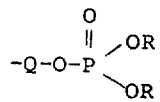

wherein Q represents vicinal carbon atoms of an alkylene radical containing from 2 to 20 carbon atoms. Illustrative of such alkylene radicals are ethylene, isopropylene, 2,3-butylene, 1,2-amylene, 1,2-heptylene and the like. R' is OR or R.

Since the only substituents which are reactive in the condensation reactions described herein are the 2-haloalkyl or alkyl radicals, the remaining substituents play essentially no role in the reaction chemistry and therefore can be essentially any hydrocarbyl radical or any hydrocarbyl radical further substituted with non-interfering substituents. Illustrative hydrocarbyl radicals include, for example, alkyl of from 1 to 20 carbon atoms, such as methyl, ethyl, n-propyl, isopropyl, sec.-butyl, tert-butyl, hexyl, octyl, eicosyl and the like, particularly alkyl of from 1 to 4 carbon atoms, aryl, especially phenyl, aralkyl such as α-methyl -methyl benzyl and the like; alkaryl such as tolyl, xylenyl, isopropylphenyl, t-butylphenyl and the like; alkenyl of from 2 to 20 carbon atoms such as vinyl, isopropenyl, allyl, 1-butenyl, 2-butenyl and the like; alkadienyls such as butadienyl, isoprenyl and the like; alkynyl such as acetylenyl, propargyl, 1-butynyl and the like; cycloalkyls such as cyclopropyl, cyclohexyl and the like; cycloalkenyls such as cyclobutenyl, cyclopentenyl, cyclohexenyl and the like; cycloalkadienyls such as cyclohexadienyl, cyclooctadienyl and the like, arylalkenyls such as cinnamyl, styryl and the like. Also included within the definition of "hydrocarbyl" for purposes of this invention are hydrocarbyls as defined above, further substituted with non-interfering radicals such as alkoxy such as methoxy, ethoxy, butoxy and the like, aryloxy such as phenoxy; cyano; haloaryl such as chlorophenyl, bromophenyl and the like.

To obtain homopolycondensation products of the above-defined phosphorus ester, at least one R in the above formula must be a 2-haloalkyl radical in order to effect self condensation. Copolycondensation products, however, can be prepared from a phosphorus ester material comprising a mixture of the above-defined 2-haloalkyl-containing phosphorus ester and a co-condensable phosphorus ester of the formula:

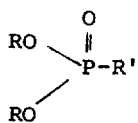

wherein R is a 2-haloalkyl of 2 to 20 carbon atoms or hydrocarbyl or

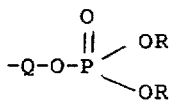

wherein Q, R and R' are as defined above. Thus, while the co-condensable phosphorus ester can include 2-haloalkyl moieties, there is no need therefor, and thus, such esters can include compounds such as dimethyl methylphosphonate, trimethyl phosphate and the like.

Typical of the condensation products to which the process of this invention is applicable are the following:

1. the co-polycondensates of tris(2-haloethyl)phosphate with other (2-haloethyl)phosphorus compounds disclosed in my U.S. Pat. No. 3,513,644;

2. the homo- and co-polycondensates of bis(haloalkyl) vinylphosphonates disclosed in my U.S. Pat. Nos. 3,641,202 and 3,695,925;

3. the homopolycondensates of tris(2-haloethyl) phosphates disclosed in my copending application Ser. No. 760,988, filed on Sept. 19, 1968;

4. the homo- and co-polycondensates of bis(2-haloethyl) vinylphosphonates disclosed in my copending application Ser. No. 153,075, filed June 14, 1971;

5. the copolycondensates of bis(2-haloalkyl vinylphosphonates disclosed in my copending application Ser. No. 187,575, filed on Oct. 7, 1971; and 6. the copolycondensates of bis-β-haloalkyl or tris-βhaloalkyl phosphates with dialkyl phosphonates disclosed in my copending application Ser. No. 410,583, filed on Oct. 29, 1973. These disclosures, insofar as they relate to the condensation products usable in the practice of the instant invention, are incorporated herein by reference. The process of this invention is particularly applicable to the copolycondensation product of bis(2-chloroethyl) vinylphosphonate and dimethyl methylphosphonate, to the copolycondensation product of bis(2-chloroethyl) vinylphosphonate and trimethyl phosphate, to the homopolycondensation product of bis(2-chloroethyl)vinylphosphonate, and to the copolycondensation product of tris(2-chloroethyl)-phosphate and dimethyl methylphosphonate.

Briefly, the polycondensation products are produced by reacting the monomers (both of which, as has already been noted, may be the same) to give off a volatile alkyl halide and leave behind a non-volatile oligomeric condensation product.

The polycondensation reaction can be run without a catalyst, but, to permit lower temperatures and/or shorter reaction times, it is preferably conducted in the presence of a nucleophilic catalyst. Suitable nucleophilic catalysts include alkali metal and alkaline earth compounds conventionally recognized as bases, for example, oxides such as sodium oxide, potassium oxide, magnesium oxide, calcium oxide, and the like; alkali metal and alkaline earth hydroxides, such as sodium hydroxide, potassium hydroxide, magnesium hydroxide, calcium hydroxide, and the like; the corresponding carbonates and bicarbonates, such as sodium carbonate and bicarbonate, potassium carbonate and bicarbonate, magnesium carbonate and bicarbonate, calcium carbonate and bicarbonate, and the like; alkoxides, such as sodium methoxide, potassium ethoxide, magnesium ethoxide, calcium ethoxide, and the like; phenolates, such as sodium phenolate, potassium phenolate, calcium phenolate, and the like; salts of strong bases and weak volatile acids such as alkali metal and alkaline earth metal acetates, phosphates, chlorides, and bromides; and salts of organic phosphorus acids and partial phosphate esters. Organic bases such as amines, for example pyridine, quinoline, triethylamine, tetramethyl guanidine, N-methylmorpholine, butylamine, aniline, and the like may be used. Additionally, very weak organic bases such as amides, for example N-methylpyrrolidone and hexamethylphosphoric amide, are effective. The definition of "nucleophilic catalyst" in the context of the present invention extends to those substances known as "Lewis bases," i.e., electron pair donors, and thus includes for example trialkylphosphines, triphenyl phosphines, tributyltin oxide, and the like.

Additionally, substances not normally considered bases such as alkali metal halides, e.g. sodium chloride, sodium bromide, and the like, potassium chloride, potassium bromide, and the like, are also included within the term nucleophilic catalyst as used herein inasmuch as they are sufficiently nucleophilic to effect cleavage of the phosphate. Suitable quantities of catalyst are from a few parts per million, e.g., 50 p.p.m., up to about 10% by weight, preferably 0.01–5% based on weight of the reaction mixture.

The reaction mixture, with proper amount of catalyst, if desired, and in the desired molar ratio of starting materials, is heated to a temperature within the range of from about 110° to about 250°C., preferably 120°C. Further details concerning the condensation reaction may be found in the disclosures previously incorporated herein by reference.

In addition to volatile alkyl halides, which can easily be removed, the residual polycondensation products also are generally found to contain by-product acidic structures to some extent. Where the polycondensation products are relatively small molecular weight products such as the sort illustrated by the formulae:

or

the product may be freed of acidic by-products by such simple means as washing with an aqueous solution of a base, such as sodium carbonate. However, where the product is a relatively higher molecular weight polymer such as

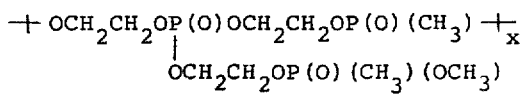

where *x* being, for example, 2–20, the acidic by-product structures represent end groups on many or most of the polymer chains and removal by simple washing means becomes impracticable.

According to the present invention, means has been found for substantially neutralizing such acidic by-products thus rendering them harmless when the polycondensation product is to be used for applications where acid can cause catalysis problems, such as in urethane foams or textile finishes. It is a further significant feature of the invention that in the neutralization of said acidic by-products, means has been found for conveniently creating useful functional groups, in particular alcohol end groups. Where said acidic structures occur as end groups on most or all of the polymer chains, the introduction of alcohol end groups makes the polycondensation polymer a "reactive" flame retardant rather than an "additive" flame retardant, i.e., the flame retardant can become attached by the alcohol end group to a polymer matrix such as that of a urethane foam polyester, aminoplast resin, phenolic resin or the like thus imparting flame retardant properties which are not readily subject to loss resulting from migration, volatility or leaching.

The acidic structures present in the polycondensation products of the invention appear to be of two principal types: (1) true acids and (2) structures which generate acid rapidly in water. Experimental data show that the acid content as determined by titration of the product in water, after a few minutes waiting time, is substantially in excess of the acid content as determined by titration of the product in alcohol solution.

It is believed that the difference between these two acid content values is represented by labile cyclic five-membered phosphate ester rings having the formula:

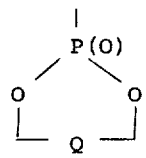

wherein Q represents vicinal carbon atoms of an alkylene radical containing from 2 to 20 carbon atoms. Illustative of illustrative rings are:

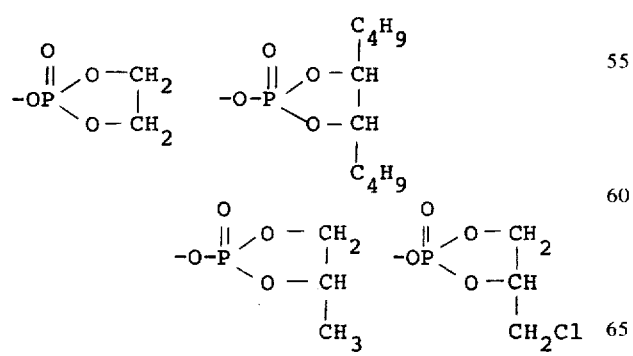

In water, these groups open within minutes at room temperature to form true acid groups, exemplified by the formula:

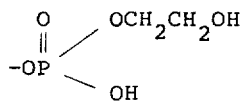

In alcohols, especially in primary alcohols, these cyclic ester groups open to neutral ester groups, exemplified by the formula:

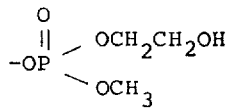

The other acidic structures present in the polycondensation product are believed to be true acidic groups of the type P(O)OH, and undergo titration with base identically in alcohol or water. Some pyrophosphate structures may also be present in minor amounts.

Several alternatives exist for elimination of these acidic structures from the polycondensation products of the invention. Direct introduction of an alkylene oxide such as $C_2$–$C_8$ alkylene oxides including ethylene oxide, propylene oxide, butylene oxide, octylene oxide, epichlorohydrin, glycidol, epibromohydrin, styrene oxide, glycidyl ethers such as the diglycidyl ether of bisphenol-A, epoxy cycloalkanes such as the diepoxide of cyclohexenylmethyl cyclohexenylcarboxylate, butadiene diepoxide, vinylcyclohexene diepoxide, 4,4,4-trichloro-1,2-epoxy butane, or the like will rapidly neutralize the true acid groups, yielding 2-hydroxyalkyl structures in their place, and will slowly neutralize the labile cyclic ester groups by a reaction which stoichiometrically amounts to ring opening of both the cyclic ester and epoxide ring, forming a linear ester structure in their place. Such direct epoxide reactions with the crude (acidic) polycondensation products of the invention are useful but tend to be relatively slow and difficult to cary absolutely to completion. An orthoester such as trimethyl orthoformate will neutralize the true acid structures by conversion to ester, but will not eliminate the cyclic esters.

The preferred process for eliminating the acidic structures is a process wherein (1) the labile cyclic ester structures are opened by reaction at ambient temperatures of about 20° to about 180°C., preferably 50° to 150°C., with a reagent

YOH where Y is alkyl of from 1 to 20 carbon atoms unsubstituted or substituted by noninterfering substituents, and (2) the true acid structures are neutralized by reaction with an epoxide or an orthoester to form ester groups. These two steps can be run concurrently or successively.

As the group Y in the ring-opening reagent, any alkyl or substituted alkyl group can be used so long as the substituent or substituents do not adversely affect the ring-opening reactions and do not cause undesirable side reactions, e.g. reactions with portions of the polycondensation product which would result in a loss of or reduction in fire-retardant properties. Usable substituents thus include aryloxy, halogen, alkoxy, alkenyl, aryl, acyl, acyloxy, hydroxy, amido, alkylthio, arylthio, carbalkoxy, carboxamido, cyano and nitro. Suitable ring-opening reagents are exemplified by methanol, ethanol, n-butyl alcohol, lauryl alcohol, other monohydric alkanols having up to 20 carbon atoms, allyl alcohol, 2,3-dibromopropanol, tribromoneopentyl alcohol, dibromoneopentylene glycol, ethylene glycol, dibromobutenediol, diethylene glycol, methoxyethanol, ethoxyethanol, butoxyethanol, 2-chloroethanol, benzyl alcohol, glycerol, pentaerythritol, dipentaerythritol, trimethylolethane, trimethylolpropane, sorbitol, glucose, sucrose, lactose, methylglucoside and polyoxyalkylated (especially polyoxyethylated or polyoxypropylated derivatives of any of the aforementioned polyols, acryloxyethanol, carbamyloxyethanol, acetoxyethanol, methacryloxyethanol, N-hydroxymethylacrylamide, vinyl hydroxyethyl ether, methylolamines, methylolureas, and hydroxymethylphenols.

In addition to the above-described ring-opening reagents, water may also be used to open the five membered phosphorus ester ring. In this case, the polycondensation product would not be neutralized by the ring-opening reaction and, if neutralization is desired, it will be necessary to react the product with an epoxide or an orthoester group.

This ring opening step of this invention allows the introduction of valuable functional groups. In a preferred aspect of the invention where at least one of the reactants used to make the polycondensation product is a phosphate, many of the oligomer molecules will be terminated by the afore-mentioned labile cyclic phosphate ester groups and therefore at least one functional group can be imparted in the ring-opening step to many of the molecules. Where the oligomer is large, i.e. above 2 phosphorus atoms per mole, most of the molecules may be so functionalized. Through the choice of water, a monohydric alcohol, a diol or a polyol as the ring opening reactant, options are made available as to the average functionality of the product. In the following equations, a phosphorus-containing chain, such as

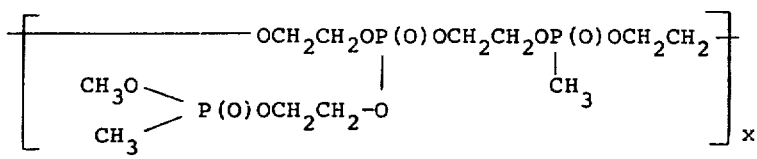

is represented by the symbol Z and the chemistry of the cyclic end group is illustrated by the following reaction schemes:

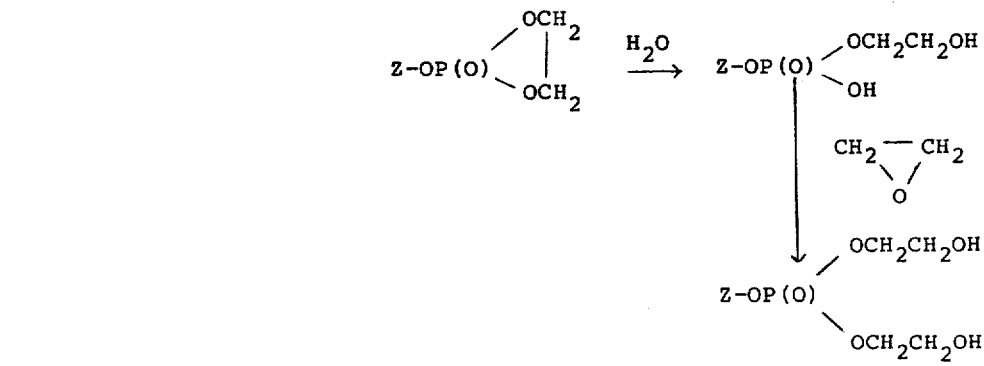

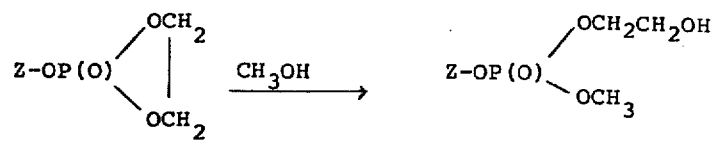

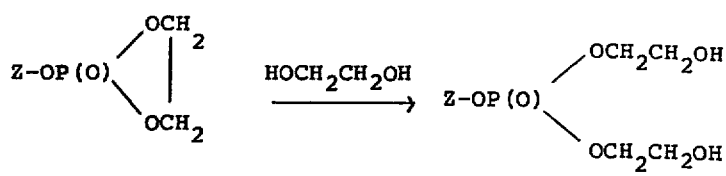

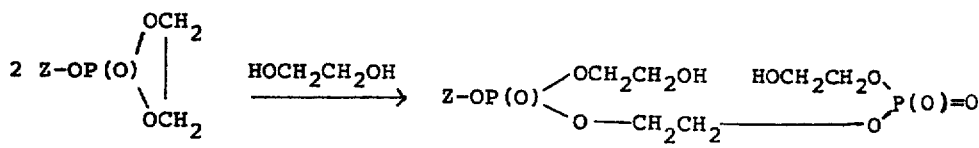

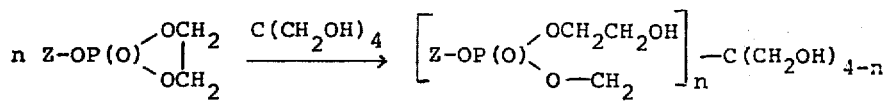

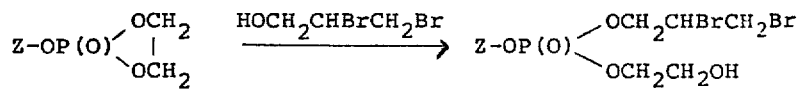

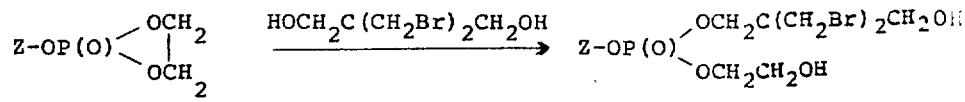

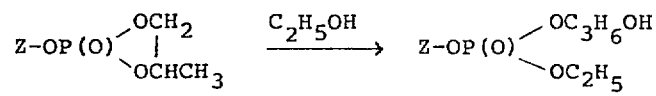

The other end group on Z can be the same as the end group shown, or can be, for example $(CH_3O)(CH_3)P(O)—$ or $(HOCH_2CH_2O)(CH_3)P(O)—$, the latter resulting from $(HO)(CH_3)P(O)—$ plus ethylene oxide. In general, only the average functionality of the products is known, the products being mixtures as heretofore explained.

In another aspect of the invention, where all of the components of the polycondensation reaction are phosphonates, the cyclic five-membered phosphorus ester structures are not attached as oligomer chain ends but are simple monophosphonates, and undergo ring opening as illustrated by the following equation:

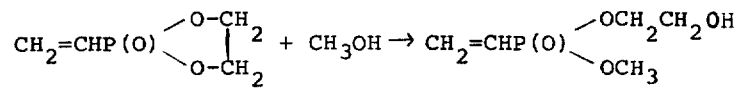

Neutralization of the true acid structures in all of these products is accomplished by the previously known treatment with an epoxide reagent or an aliphatic orthoester. The epoxide reagent is a compound having one or more

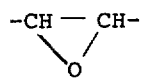

groups. These include the alkylene oxides set forth above. Suitable orthoesters are compounds having a

group in which R is hydrocarbyl, preferably alkyl of from 1 to 6 carbon atoms. Particularly suitable is trimethyl orthoformate. This neutralization reaction may be run at a temperature of from about 25° to about 225°C, preferably from 50° to 150°C, over a period ranging from 5 minutes to 24 hours.

By means of the Y group introduced in the ring-opening step as well as the 2-hydroxyalkyl groups from the alkylene oxide, the products of the invention can be made to have various controllable degrees of OH functionality, for example, OH numbers (as conventionally defined in terms of mg. KOH/g) in the range of 30–100 for use in flexible urethane foams or above about 100 for use in rigid urethane foams. The OH groups also serve as binding sites for incorporation of these products into durable textile finishes, where a coreactant system such as dimethyloldihydroxyethylene urea plus an acid catalyst, a methylolenelamine, plus an acid catalyst, or N-methylolacrylamide plus a free radical conjointly with an acid catalyst may be employed. Where unsaturated groups are present in the alcohol, as in several listed above, these groups may act as binding sites in polymerizable systems such as polyester resins or textile finishes cured by free-radical means. Where a methylolmelamine, methylolurea or methylolphenol is used as the reactant alcohol, these groups may act as binding sites in related thermosetting resins or resin finishes.

The following examples are inserted to illustrate the practice of this invention. They are presented here for illustrative purposes only and are not to be construed as limitations. All percentages and parts are by weight unless otherwise specified.

EXAMPLE I

Neutralization Of Polycondensate of Tris(2-chloroethyl)phosphate by Ethylene Oxide Alone Tris(2-chloroethyl)phosphate (viscosity, 36 cps at 25°C) was heated in the presence of 0.2% $Na_2CO_3$ catalyst at 160°–180°C. allowing ethylene dichloride to be distilled off until the viscosity of the residual product was 4500 cps (measured at 25°C. after sparging out dissolved ethylene dichloride). At this point, the residual product had an acid content of 0.50 milliequivalents per gram (measured in water) and an attempt to use it as a flame retardant in flexible urethane foam resulted in foam collapse due to excess acidity.

Attempts were made to neutralize the material by direct treatment with ethylene oxide. By rapid feeding of liquid ethylene oxide at 90°–100°C. over 2 hours, the product was reduced to an acid content of 2 mg KOH/g. but the viscosity had increased to 10,000. Also at this level of acidity, a urethane foam made using it as a flame retardant at 10 phr had a sticky uncured top and had to be rejected.

A further neutralization attempt wherein ethylene oxide gas was introduced at 90°–100°C. for 12 hours caused the product to gel in one run and to go to an intractable viscosity (40,000 cps at 25°) in another run.

By starting with tris(2-chloroethyl) phosphate polycondensation products of lower viscosity (600–1100), it was possible to get these products to neutrality by treatment with ethylene oxide, but these products had OH numbers of below 12, and, not having much OH functionality, they were found to be extractable from urethane foams in which they were incorporated.

EXAMPLE 2

Two-step Neutralization of
Tris(2-chloroethyl)phosphate Polycondensate Using
Methanol, then Ethylene Oxide The same intermediate as in example 1 was admixed with 2% by weight of methanol, and the mixture heated for 2 hrs. at 90°–100°C. It was then treated with ethylene oxide until neutral, and finally sparged and vacuum stripped to remove any dissolved ethylene oxide, unreacted methanol if any, and other volatiles. The resultant product has a viscosity of 4000 cps. (25°C.), an acid number of less than 0.1 mg KOH/g., and an OH number of 40 mg. KOH/g. When incorporated into a flexible urethane foam recipe at 10 phr (on polyol), the resultant foam cured at the normal rate and exhibited undeteriorated physical properties. The flame retardant was not extracted by $CH_2Cl_2$, establishing that it had reacted into the foam.

EXAMPLE 3

Two-step Neutralization of
Tris(2-chloroethyl)phosphate Polycondensate Using
Water, then Ethylene Oxide To 500 parts of the same unneutralized intermediate, as in example 1, 4.2 parts of water were stirred in the mixture heated at 90°–100°C. for 1 hr. At this point, ethylene oxide was introduced until the product was neutral. The product was found to have an acid number measured either in alcohol or water, of less than 0.1 mg KOH/g., and an OH number of 83. The product was found to behave satisfactorily as a flame retardant reactive polyol in a flexible urethane foam.

EXAMPLE 4

Two-step Neutralization of
Tris(2-chloroethyl)phosphate Polycondensation Using
Diethylene Glycol then Ethylene Oxide.

To 500 parts of the same unneutralized intermediate as in Example 1, 21g. of diethylene glycol was added and the mixture was stirred and heated at 90°–100°C. for 8 hrs., then the remaining acidity was neutralized by passing in ethylene oxide. The resultant product has an acid number of less than 0.1 mg. KOH/g. in either alcohol or water, and an OH number of 104. It behaved satisfactorily as a flame retardant reactive polyol in a flexible urethane foam.

EXAMPLE 5

To 650 gms. of crude polycondensation product of tris(2-chloroethyl) phosphate made as described in the preceding example by removal of 21–22% ethylene dichloride and exhibiting a viscosity of 3000 cps (measured at 25°) was added 10 wt. % of ethyl alcohol. The reaction mixture was heated at 90°–98°C for 2 hours then a vacuum was applied to remove excess ethyl alcohol. At this point, the titrations for total acid and cyclic ester, i.e., the aqueous titration and the titration for true acid, i.e., the alcoholic titration, had nearly converged. 2.2 wt.% of the diepoxide of cyclohexenylmethyl cyclohexene carboxylate (Union Carbide "ERL 4221") was then added and the mixture further heated for 2 hours at 95°–104°C until no further acid was detectible by either alcoholic or aqueous methods of titration.

This product was found to function as a flame retardant in flexible urethane foams at 10 p.h.r. and showed no deleterious effect on rate of foam rise, strength, open-cell content, or color; whereas, a product made by neutralizing the same crude condensation product by ethylene oxide showed repression of the rate of the foaming reaction, reduction of foam strength, and a substantual degree of discoloration ("scorch").

EXAMPLE 6

Copolycondensate of 7 Moles of Dimethyl
Methylphosphonate and 6 Moles of
Bis(2-chlooroethyl) vinylphosphonate Treated with
Methanol In a reactor fitted with a stirrer, vertical reflux condenser, and effluent line from the latter to a dry-ice cooled receiver, there is placed 2,796 gms. (6 moles) of bis(2-chloroethyl) vinylphosphonate, 1,736 gms. (7 moles) of dimethyl methylphosphonate and 10 gms of sodium carbonate. The reactor is stirred and heated. At 135°–140°C., the evolution of methyl chloride begins and the temperature is then raised over about 5 hours of 190°C. and held at this temperature until the rate of collection of distillate, i.e. of methyl chloride and a minor percentage of ethylene dichloride, in the dry-ice trap becomes less than 10 cc/hour. The reaction mixture is then sparged briefly with nitrogen. By titration in water, the 3,317 gms. of residual product is found to contain 1.4 milliequivalents per gm. of total acidity.

The above-described reaction product is treated at 100°–110°C. with 182 gms. of methanol over 1 hour, thus reducing the acidity to 0.4 milliequivalents per gm. The acidity is then reduced to a negligible level, i.e. to less than 0.1 milliequivalents per gm, by passing in ethylene oxide over 3 hours at 100°–110°C. The resultant product, after brief sparging with nitrogen to remove dissolved ethylene oxide, comprises 3,498 gms. of a pale yellowish clear liquid, $n_D^{25}$ 1.4735, acid no. 0.42 mg. KOH/g., which is soluble in water and has a chlorine content of only 0.42%. As expected, the nuclear magnetic resonance spectrum shows about 1.16 $CH_3$—P(O) groups per $CH_2$=CH—P(O) group.

EXAMPLE 7
Copolycondensate of 2 Moles of Dimethyl Methylphosphonate and 1 Mole of Bis(2-chloroethyl)vinylphosphonate treated with Methanol A mixture of 1 mole (233 gms) of bis(2-chloroethyl) vinyl phosphonate, 2 moles (248 gms.) of dimethyl methylphosphonate, 1 gm. of sodium carbonate and 10 mg. of di-tert-butylhydroquinone is heated and stirred at 187°–197°C. for 2 hours allowing 102 gms. of volatiles, primarily methyl chloride, to distill off. The reaction mixture is then subjected to vacuum distillation at a temperature of 183°C., a vapor temperature of 126°C. while under 20 mm pressure with the distillate comprising 65 gms. of unreacted dimethyl methylphosphonate. The residual product is found by titration of a sample in water to have 1 milliequivalent of acid-yielding components per gram. The addition of 20 gms. of methanol followed by warming at 90°–100°C. for 5 hours reduces the acidity to 0.29 milliequivalent per gram, whereupon the introduction of ethylene oxide at 120°C. over a 1 hour period further reduces the acidity of nil, i.e. to a neutral response to Bromphenol blue indicator.

The product is a water-soluble syrup, the infrared spectrum of which shows vinylphosphonate, methylphosphonate, hydroxyethyl, and ethylenedioxy structures. Polymerization of this monomeric product by exposure to ultraviolet light yields a rubbery solid which cannot be ignited with the flame from a Bunsen burner.

EXAMPLE 8
Copolycondensation of Dimethyl Methylphosphonate with Tris(2-chloroisopropyl)phosphate at 2:1 Mole Ratio A mixture of 248g. (2 moles) of dimethyl methylphosphonate and 327.5g (1 mole) of tris(2-chloroisopropyl) phosphate plus 1.0g. of tetraethylammonium chloride as catalyst was heated at 150°–185°C. until 151 g (approximately 3 moles) of methyl chloride was evolved.

The residual liquid was heated with 50 g. of methanol for 2 hours at 90°C. then a vacuum was applied to remove excess alcohol and then the product was heated with 50 g. of propylene oxide under reflux at 80°C. until the alcoholic KOH titration declined to less than 1 mg. KOH/g. This step requires a substantially shorter reaction time than is required if the alcohol treatment step is omitted. The reaction mixture was then sparged with nitrogen under aspirator vacuum at 80°C. until it reached constant weight (less than 1 g. weight loss in 1 hr.). The product was a viscous liquid which functioned as a flame retardant when admixed with cellulose acetate (cast film) at 15%.

EXAMPLE 9
Preparation of Tris(2-chloroethyl)phosphate/dimethyl Methylphosphonate Copolycondensation Product without Use of Catalyst A mixture of 571 g. of tris(2-chloroethyl) phosphate and 531 g. of dimethyl methylphosphonate was heated at 181°–197°C until 287.5 of methyl chloride was evolved; this required 26 hours. The product was then heated at 95°C. with 28.2 g. of methanol, and finally treated with ethylene oxide at 90°–100°C. until substantially neutral. The product was useful as a flame retardant at 5–10 phr. in a styrenated polyester.

EXAMPLE 10
Copolycondensate of 1 Mole of Bis(2-chloroethyl) vinylphosphonate with 1.33 Moles of Trimethyl Phosphate Treated with Methanol A mixture of 233 gms. (1 mole) of bis(2-chloroethyl) vinylphosphonate, 187 gms. (1.33 moles) of trimethyl phosphate, 1 gm. of sodium carbonate and 0.1 gm. of hydroquinone is heated at 159° to 196°C. over 5 hours while collecting about 2 moles of methyl chloride. The residual product is briefly purged with a stream of dry nitrogen, thereby causing another 3 gms. of distillate to be removed. The residual product contains less than 0.5% Cl and has an acidity of 0.4 milliequivalent/gm. Heating for 1 hour at 100°C. with 20 gms of trimethyl orthoformate and 10 gms. of methanol, reduces the acidity of 0.21 milliequivalent/gm. The product is a nearly colorless water-soluble syrup, $n_D^{25}$ 1.400, having an infrared and nmr spectrum consistant with the structure of a copolyester of a vinylphosphonate and methylphosphonate linked by P—O—$CH_2CH_2$—OP groups and terminated by P—$OCH_3$ groups.

This monomer, when exposed to the radiation from a high pressure mercury arc lamp for 12 hours, polymerizes to a colorless elastomeric solid which resists ignition when held in a Bunsen burner flame.

EXAMPLE 11
Preparation and Characterization of 2:1 Dimethyl Methylphosphonate-tris (2-chloroethyl) Phosphate Co-condensation Product A mixture of 2480g (20 moles) of dimethyl methylphosphonate, 2855g (10 moles) of tris(2-chloroethyl) phosphate and 20 g of sodium carbonate (catalyst) was stirred and heated in a vessel fitted with a reflux condenser, allowing methyl chloride to escape from the outlet of the reflux condenser. Evolution of methyl chloride (identified by its boiling point) ensued at about 140°C.; the temperature of the reaction mixture was raised over 4½ hours to 183°C. and held about 1 hour until the rate of methyl chloride evolution dwindled to a negligible rate of 0.15g per minute. At this point, the weight loss of the residual reaction mixture was 1503g, corresponding closely to the theoretical 1515g (30 moles) of methyl chloride for the theoretical reaction indicated above.

That the reaction had resulted in the evolution of practically all of the chlorine content of the reactant as volatile methyl chloride was also confirmed by analysis of the residual reaction product for total chlorine, which was found to be only 0.4%.

The product at this point had an acid content of 0.2 meq/g as determined in methanol and a total acid plus cyclic ester content of 0.97 meq/g as determined in water, allowing 10 minutes hydrolysis time before titration; thus the cyclic ester content is estimated by difference to be about 0.77 meq/g. The product at this point is suitable for flame retardant use in systems not sensitive to acid content, for example, in polyester resins, but not generally suitable for use in urethane forms because of the interaction of its acid component with the catalysts used in urethane foam manufacture.

That very little free dimethyl methylphosphonate was present in the product was proved by vacuum stripping to 90°C. at 0.1mm Hg which caused a weight loss of only 4%.

EXAMPLE 12

Conversion of the Product of Example 11 to Neutral Alcohol

The product of Example 11 was admixed with 120 g (3.7 moles) of methanol, a small molar excess over the amount of cyclic ester indicated by the titration assay described and heated at 95°-100°C. for 1 hour until the methanolic and aqueous titrations became 0.4 meq/g and 0.24 meq/g respectively, indicating 0.16 meq/g of cyclic ester remaining. The residual acidity was then eliminated by introduction of ethylene oxide at 90°-97°C. over 5 hours.

The final product was a nearly colorless syrup, viscosity 6000 cps. at 25°C., containing 23.3%P., 0.4% Cl, and having an OH number of 79.8.

When the methanol treatment is omitted and the crude product is treated directly with ethylene oxide to the point of neutrality, the OH number is only 14.5 mg KOH/g. Such a low OH product is suitable as a flame retardant additive for urethane foams but has little bonding capability and can largely be removed by leaching the foam with a solvent.

EXAMPLE 13

Conversion of the Product of Example 11 to a Diol-terminated Analogue of the Product of Example 12

To 600g of the product of Example 11 was admixed 10.6g (0.59 mole) of water, substantially equivalent to the assayed amount of cyclic ester. After heating the mixture at 100°C. for 1 hour, the methanolic and aqueous titrations were found to be 1.04 meq/g and 1.06 meq/g respectively, indicating that essentially all of the cyclic ester had been opened to 2-hydroxyethyl acid phosphate end groups of the structure

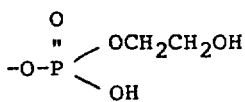

This acid product was neutralized by introduction of ethylene oxide at 100°C. for 5 hours. The resultant product was found to have no acid content or cyclic ester content by methanol, KOH and aqueous NaOH titrations. The OH number of this product was found to be 99 and the %P was found to be 22.0.

EXAMPLE 14

Use of Product of Example 12 in Flexible Urethane Foam as a Permanent Flame Retardant Reactant A urethane foam formulation was made as follows:

| | Parts by Weight |
|---|---|
| Niax 16-46 polyol, a commercial polypropylene glycol manufactured by Union Carbide Corp. | 100 |
| Water | 4 |
| Flame Retardant Product of Example 9 | 4 |
| Silicone L-548 surfactant, a commercial dimethylsiloxane polymer manufactured by Union Carbide Corp. | 1 |
| Bis(dimethylaminoethyl) ether (catalyst) | 0.1 |
| N-Ethylmorpholine (catalyst) | |
| Stannous octoate (catalyst) | 0.25 |
| Tolylene Diisocyanate Index | 110 |

A 1.8 lb./cu.ft. foam was obtained containing 0.67% P. This foam was then tested by the method of Federal Motor Vehicle Safety Standard 302 and was found to have a rating of "Self-extinguishing-no burning rate" initially and after dry heat aging at 140°C. for 22 hours and Self-extinguishing (2.8 inches per minute burn rate) after 5 hours humid autoclaving at 250°F. Tensile strength was 17.7 lb/sq. in. compared to 18.9 for the comparison foam without flame retardnat. In the dry heat aging, a weight loss of only 1.2% was observed, while the foam without flame retardant lost 0.34% and a similar foam flame-retardant with two commercial additive flame retardants (tris(dichloropropyl) phosphate and tetrakis(2-chloroethyl) dichloroneopentylene diphosphate) lost 7.3 and 2.5% respectively. That the product of Example 12 had become bound to the polymer matrix was also shown by methylene chloride extraction of the foam followed by phosphorus analysis, which showed that 91% of the flame retardant was retained, contrasted to 0% and 16% retained in the case of the two additive flame retardants metnioned above. The home-polycondensed product of tris(2-chloroethyl) phosphate was only retained to the extent of 31% in this test.

In the standard window-fogging test, the foam made using the product of Example 12 showed 93% retention of windowlight transmittance whereas the two additive flame retardants allowed only 40 and 87% transmittance respectively.

The standard fogging test measures fog tendency, which is a tendency of plasticizers, flame retardants, etc., in automobile components—such as vinyl seat coverings and urethane foam cushioning—to cause a fog which in turn causes glare and lack of transparency in the windows. This tendency is measured by placing foam specimens in glass containers in an oven arranged such that the foams are warmed and the glass surfaces are cooled. The amount of loss of transparency is measured. Values above 90% are considered satisfactory; values below 90% are regarded as failure.

EXAMPLE 15

Use of Product of Example 12 in a Polyester Resin

The product of Example 12 was added at 5 phr to a chlorendic-acid-derived polyester resin (Hetron 24370, a product of Hooker Chemical Co.) and the resin cured as a 3-ply glass reinforced laminate (30% glass content) at room temperature using methyl ethyl ketone peroxide and cobalt naphthenate catalyst until a Barcol hardness of 53 was reached. The cured product has an oxygen index of 35.8 and an HLT-15 flame retardant test rating of 100. Substantially lower ratings were obtained using 5 phr of trimethyl phosphate, triethyl phosphate, tris(2-chloroethyl) phosphate, polycondensed tris(2-chloroethyl) phosphate, or the 1:1 copolycondensate of dimethyl methylphosphonate with tris(2-chloroethyl) phosphate (2 moles of $CH_3Cl$ removal per mole of phosphate).

The HLT-15 Flame Retardant Test is a test for flame retardancy of reinforced laminates developed by Hooker Chemical Corp. It is designed to determine the self-estinguishing quality of resins in the form of fiber glass mat reinforced laminates. In the rating systems, the top rating for flame retardancy is given the value of 100. A detailed method of operations and further information concerning this test may be found in a paper by A. J. Hammerl, "Burning Tests for Thermosetting Resins", given at the 17th Annular Technical and Management Conference on Reinforced Plastics, in February, 1962.

Surprisingly, a 72 hour water boil of these polyester laminates removed only 0.54% by weight, which compares favorably with the 3.6–3.8% extraction observed with poly(ethylene methylphosphonate) in an analogous formulation. Since both flame retardants are, themselves, water-soluble, this resistance to leaching from the polyester resin observed with the product of the present invention is surprising and unexpected.

EXAMPLE 16

Preparation of 2.14:1 Mole Ratio Dimethyl Methylphosphonate/Tris(2-chloroethyl)phosphate Copolycondensation Product and Treatment thereof with Methanol A vessel fitted with stirrer, thermometer, heating mantle, and vertical reflux condenser was charged with 5308g(42.8 moles) of dimethyl methylphosphonate, 5710 g. (20 moles) of tris(2-chloroethyl)phosphate, and 40 g. of anhydrous sodium carbonate. After a brief nitrogen purge to remove air (and thus avoid possible oxidative color development) the reaction mixture was raised to 135°C, at which point methyl chloride began to be evolved from the condenser outlet. Over 5 hours, the temperature was gradually raised to 185°C. and held for 27 hours at which time measurement of the rate of methyl chloride evolution showed the rate to have dwindled to 0.18 cc/min. At this point, weighing the remaining reaction mixture showed that a weight loss of 3044g. had occurred, corresponding to 60.3 moles of methyl chloride (as against a theoretical loss of 60 moles). While stirring was continued, the reactor was allowed to cool to about 92°C. under dry nitrogen. Then 282g. (8.8 moles) of methanol was added over 5 minutes. This quantity was a small excess over the calculated amount of cyclic glycol ester, 7.8 moles, which has been determined to be present by the fact that a sample held for 10 minutes in water and then titrated with 0.1-N NaOH to Bromphenol blue end point showed 1.14 milleequivalents of acid plus cyclic ester per gram, whereas a titration of a sample in methanol with methanolic 0.1-N KOH to Bromphenol blue showed 0.16 milliequivalents of acid per gram; thus 0.98 milliequivalents of cyclic glycol ester per gram was present by this assay method. The reaction mixture was heated for 2 hours at 95°C., at which point the two titration results were 0.27 meq. acid plus cyclic ester per gram and 0.17 meq. acid per gram; thus only 0.10 meq. cyclic ester per gram remained by this assay method. At this point, a fast stream of ethylene oxide was introduced with stirring at 95°C. After 4 hours, the titrations by both the aqueous and alcoholic method were nil. Heating was then stopped, ethylene oxide continued as the temperature drifted down to 80°C. then vigorous nitrogen sparging was conducted at 90°–95°C. until dissolved volatiles were removed (found to be mostly dimethyl methylphosphonate).

The weight change during this devolatilization step was 3.5%. To remove final traces of acid, which reformed in the devolatilization step, the batch was briefly retreated with ethylene oxide at 95°C. Alternatively, 1% of the non-volatile diepoxide of cyclohexenylmethyl cyclohexenylcarboxylate was added. The product, by the ethylene oxide finishing method, had the following characteristics:

| | |
|---|---|
| Acid No. | less than 0.2 mg KOH/g. |
| OH No. | 50±5 mg. KOH/g |
| %P= | 22.8, 23.0 |
| %Cl= | 0.45 |
| Viscosity (25°): | 6750 cps. (½ hr. sparge at 80°C. to remove ethylene oxide raised this to 15,500 cps.) |
| Density: | 1.381 (25°C.) |
| Refractive Index: | 1.4634 |
| Appearance: | Clear light yellow syrup |

Various alternative finishing steps, are described in subsequent examples.

EXAMPLE 17

Dibromomoneopentyl Glycol-Modified Copolycondensation Product

A mixture of 500 g of the crude copolycondensation product of dimethyl methylphosphonate and tris(2-chloroethyl) phosphate (2.14:1 mole ratio, as described in Example 16) and 131 g. dibromoneopentyl glycol was stirred and heated at 98°–100°C. for 3 hours. At this time, titrations of samples of the reaction mixture to naphtholbenzein end point with alcoholic KOH showed 0.23 meg. acid/g., and titration with aqueous NaOH in water solution showed 0.28 meq. acid/g., indicating that the cyclic phosphate ester content of the crude condensation product has been substantially consumed by reaction with the dibromoneopentyl glycol. The product mixture was then neutralized completely by the passage of ethylene oxide at 90°–100°C. for 4 hrs. The resultant product was a pale yellowish syrup, completely water soluble, and having 18% P and 12.7% Br content, together with 1.6 millimoles of alcoholic functional groups per gram.

When this product (as an aqueous solution) was padded onto cotton-polyester fabric at 20% dry add-on along with 10% dry add-on N-methylolacrylamide and 1% ammonium persulfate catalyst, and cured at 100°–140°C, the resultant product had excellent flame retardant properties durable to laundering.

EXAMPLE 18

Dibromopropyl-Modified Copolycondensation Product

In like manner to the preceding example, a product was made using 109 g. of 2,3-dibromopropanol in place of the dibromoneopentyl glycol. The resultant product has 18.5% P, 13.1% Br, and 1.6 milliequivalent of OH end groups per gram. It similarly was water-soluble and afforded a durable flame retardant finish when co-cured with N-methylolacrylamide and a persulfate catalyst on cotton polyester fabric.

EXAMPLE 19

Tribromoneopentyl-Modified Copolycondensation Product

In like manner to the Example 17, 170 g. of tribromoneopentyl alcohol is reacted with the same crude 2.14:1 copolycondensation product. The end product, although not completely water-soluble, has sufficient emulsifying character to hold the insoluble components in suspension with only gentle agitation. In this form, the product is usable as a flame retardant finish for textiles. It contains 17.9% Br and 16.8% P.

EXAMPLE 20

Use of Ethanol and Various Epoxides in the Neutralization Steps.

The crude copolycondensation product of 2.14 moles of dimethyl methylphosphonate and tris(2-chloroethyl)phosphate of Example 16 was reacted with 10% by weight of ethanol by heating at 95°C for 3 hours until the aqueous NaOH and alcoholic KOH titrations becomes almost equal. Two portions of the product were then treated with 3.5% by weight of propylene oxide and 4.5% by weight of epichlorohydrin, each at 95°C. until the reaction mixture was substantially neutralized in each case.

EXAMPLE 21

Use of Diethylene Glycol in the Neutralization Step

The crude 2.14:1 dimethyl methylphosphonate/tris(-2-chloroethyl)phosphate copolycondensation product of Example 16 was heated at 95°C for one day with 10% by weight of diethylene glycol, until the alcoholic KOH titration and the aqueous NaOH titrations of samples of the mixture became substantially equal. The product was then treated with ethylene oxide at 90°–100°C. The resultant clear colorless neutral water-soluble product has an OH number of 82 mg. KOH/g. and was a durable flame retardant when incorporated into a flexible urethane foam at 5 phr.

EXAMPLE 22

Use of Ethanol and a Diepoxide in the Neutralization Steps

A mixture of 500 g. of the crude 2.14:1 copolycondensation product of Example 16, was reacted with 22 g. ethanol at 90°–100°C for 2 hours. At this point, the alcoholic KOH titration showed 0.245 meq. acid per gram. Therefore, 0.245 millimole of diepoxide ("ERL-4221", a product of Union Carbide Co., the diepoxide of cyclohexenylmethyl cyclohexene carboxylate) was added per gram of crude product; i.e. 32 g. of this diepoxide was added. Heating was continued at 95°C. until the reaction mixture was acid-free. This procedure allows 0.245 millimole of epoxide group per gram to remain unreacted, as a stabilizing acid-acceptor component to prevent development of acidity in storage and handling of the product. The product is usable as a flame retardant reactant in acid-sensitive urethane foam compositions. A similar objective is alternatively accomplished by addition of 0.1-5% of an epoxide, such as the ERC-4221 diepoxide, to the already neutralized copolycondensation products, such as the finished products of Examples 17-21.

Further stabilization in storage and use of this product was accomplished by dissolving it in 0.1% of phenothiazine or an acetone-diphenylamine condensation product, both of which are known antioxidants.

EXAMPLE 23

Copolycondensation Product Modified by 2-Hydroxyethyl Acrylate and Glycidyl Methacrylate.

A mixture of 500 g. of the crude 2.14:1 mole ratio copolycondensation product of dimethyl methylphosphonate and tris(2-chloroethyl) phosphate of Example 12 plus 55 g. of 2-hydroxyethyl acrylate and 0.05 g. of methoxyphenol (as polymerization inhibitor) was heated at 90°–100°C. for 4½ hours. 28.4 g. of glycidyl methacrylate was then added and the mixture was heated for 2 hours at 90°–100°C. The resultant clear product could be copolymerized in bulk with 10 parts per hundred of methyl methacrylate by heating at 80–105°C with a catalytic amount of azobisisobutyronitrile (200 ppm) to afford a self-extinguishing casting. A similar product, affording a lower degree of cross-linking, was obtained by using ethylene oxide in place of glycidyl methacrylate.

EXAMPLE 24

Copolycondensation Product Modified by 2-Hydroxyethyl Carbamate and the Methylolation Product thereof A mixture of 500 g. of the same crude copolycondensation product as in the preceding example plus 52.5 g. of 2-hydroxyethyl carbamate was heated at 90°–95°C. for 12 hours, then ethylene oxide was passed in for 3 hours at 90°–95°C. The resultant product showed 1530 —NH$_2$ spectral bands at 1612–1618, 3200 and 3380 cm$^{-1}$. To this product was added 30 g. of paraformaldehyde and 10 cc. of triethylamine (as catalyst), and the mixture heated at 95°–100°C. for 3 hours at which point all of the paraformaldehyde had dissolved. The infrared spectrum at this point showed no NH$_2$ bands at 3200, 3380 or 1612–1618 cm$^{-1}$ but instead, had NH bands at 1522- 1530 and a large OH at 3280–3360 cm$^{-1}$. This product, applied in water solution, along with 1% ammonium chloride, to cotton cloth at 20% dry add-on and cured at 130°–150°C for 5 min., affords a durable flame retardant finish.

EXAMPLE 25

Copolycondensation Product Modified by N-methylolacrylamide

A mixture of 500 g. of the crude copolycondensation product of Example 12, plus 50.5 g. of anhydrous N-methylolacrylamide and 0.5 g. of p-methoxyphenol (as inhibitor) was stirred and heated at 88°–91°C. for 2 hours while bubbling air through the mixture to further inhibit polymerization. The product was centrifuged to remove some solid polymeric by-product. The supernatant syrup was water-soluble.

When applied (in aqueous solution) to cotton cloth at 20% dry add-on along with 1% potassium persulfate and polymerized thereon by exposure to superheated steam, a durable flame-retardant finish is obtained.

EXAMPLE 26

Copolycondensation Product Modified by Pentaerythritol

A mixture of 760 g. of the crude copolycondensation product of Example 12 plus 49 g. of pentaerythritol (1 mole for 2 molar equivalents of cyclic ester as determined by alcohol KOH and aqueous NaOH titrations) was heated at 95°–105°C. for 3 hours. At this point, the alcoholic KOH titration and aqueous NaOH titration were found to be approximately equivalent (0.2 meq/g.). The reaction mixture was then treated with ethylene oxide for 4½ hours at 90°–100°C. until it was acidfree. The product was a water soluble syrup of 26,000 cps. viscosity at 25°C. It is an effective flame retardant at 5–15 phr in a rigid urethane foam.

EXAMPLE 27

Use of Product of Example 6 in Preparing a Flame Retardant Thermoset Epoxy Resin A cured thermoset epoxy resin was prepared by admixing the following ingredients:

|  | Parts by Weight |
|---|---|
| Diglycidyl ether of bisphenol A sold as "Epon 828" by the Shell Chemical Co. | 10 |
| Copolycondensation product of 6 moles of bis(2-chloroethyl)vinylphosphonate and 7 moles of dimethyl methylphosphonate which has been neutralized by means of the procedure described in Example 6 | 10 |
| Triethylene tetramine (catalyst) | 6 |

The liquid mixture set to a hard solid within 24 hours and was post-cured by heating for 24 hours in the oven at 100°C. The resultant product was found to be a solid polymer which was found to be completely non-burning under the conditions of ASTM D-635-56-T whereby a horizontal bar of the resin is subjected to a Bunsen burner flame.

The structure of this polymer was investigated by curing a thin film on a sodium chloride disc and thereafter observing the infrared spectrum of the resulting film. By this means, the double bond of the vinylphosphonate group was shown to have been consumed, presumably by the addition of NH groups, since its characteristic absorption band at 1,620 cm$^{-1}$ had disappeared on curing.

EXAMPLE 28

Copolycondensation Product of the Invention in a Melamineformaldehyde Resin-impreganted Paper An admixture of 0.75 parts of the 2.14:1 dimethylmethylphosphonate/tris(2-chloroethyl) phosphate copolycondensation product of Example 12 with 2 parts of melamineformaldehyde resin was dissolved at 12% total concentration in ethanol applied to paper of the type used in automotive air filters. The impregnated paper was then dried and cured at 177°C for 10 minutes. Essentially no smoke or visible vapors were emitted during the curing process. The resultant paper containing the cured resin and flame retardant was found to be self-extinguishing when ignited from the bottom in a vertical position. To achieve the same level of flame retardancy, a higher level was required of the homopolycondensation product of tris(2-chloroethyl) phosphate, and a significant amount of visible vapor and ethylene dichloride was evolved from the latter. Likewise, a higher level was required and considerable visible vapor was evolved under these cure conditions using a commercially available oligomeric 2-chloroethyl phosphonate (Phosgard C22R, a product of the Monsanto Company) as flame-retardant. When the alcohol treatment step used in the preparation of the copolycondensation products was omitted, excessively fast and variable cure times result when the product is used as described above.

What is claimed is:

1. Condensation products of a phosphorus ester material comprising a phosphorus ester of the formula

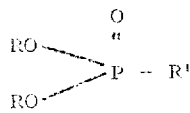

wherein R is 2-haloalkyl of 2 to 20 carbon atoms or alkyl of from 1 to 20 carbon atoms, aryl, aralkyl, alkaryl, alkenyl of from 2 to 20 carbon atoms, alkadienyl, alkynyl, cycloalkyl, cycloalkenyl, cycloalkadienyl, aralkenyl, and the alkoxy, aryloxy, cyano and haloaryl substituted derivatives thereof or:

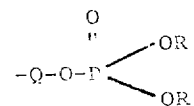

wherein Q represents vicinal carbon atoms of an alkylene radical containing from 2 to 20 carbon atoms, and R' is R or OR, with the proviso that at least one R in the above formula is a 2-haloalkyl radical, said condensation products being essentially free of five-membered phosphorus ester rings and being prepared by a process comprising heating to a temperature between about 100° and about 250°C. said phosphorus ester material, removing alkyl halide, forming:

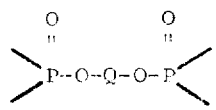

linkages wherein Q is as defined above and five-membered phosphorus ester rings, and converting said rings to open chain phosphorus esters by reaction at a temperature from about 20° to about 180°C. with a reagent of the formula:

YOH in which Y is hydrogen, alkyl of from 1 to 20 carbon atoms or alkyl of from 1 to 20 carbon atoms substituted with non-interfering substituents selected from the group consisting of aryloxy, halogen, alkoxy, alkenyl, aryl, acyl, acyloxy, hydroxyl, amido, alkylthio, arylthio, carbalkoxy, carboxamido, cyano or nitro.

2. Condensation products according to claim 1 obtained by a process comprising the additional step of substantially neutralizing the acid structures by heating at a temperature from about 25° to about 225°C. the condensation product with an epoxide selected from the group consisting of C$_2$–C$_8$ alkylene oxides, epichlorohydrin, epibromohydrin, styrene oxide, glycidyl ether cyclohexenylmethyl cyclohexene carboxylate diepoxide, butadiene diepoxide, vinyl cyclohexene diepoxide, 4,4,4-trichloro-1,2-epoxybutane or an ortho ester selected from the group consisting of radicals having the formula:

wherein R is alkyl of from 1 to 6 carbon atoms.

3. Homopolycondensation products according to claim 2 wherein the phosphorus ester is self-condensed.

4. Homopolycondensation products according to claim 2 wherein R' is OR.

5. Homopolycondensation products according to claim 4 which are obtained by a process comprising the additional step of substantially neutralizing the acid structures by heating the condensation product with an epoxide.

6. Homopolycondensation products according to claim 2 wherein R' is R.

7. Homopolycondensation products according to claim 6 which are obtained by a process comprising the additional step of substantially neutralizing the acid structures by heating the condensation product with an epoxide.

8. Copolycondensation products of a phosphorus ester material comprising a mixture of a phosphorus ester of the formula:

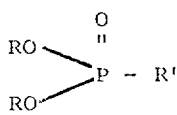

wherein R is 2-haloalkyl of 2 to 20 carbon atoms or alkyl of from 1 to 20 carbon atoms, aryl, aralkyl, alkaryl, alkenyl of from 2 to 20 carbon atoms, alkadienyl, alkynyl, cycloalkyl, cycloalkenyl, cycloalkadienyl, or aralkenyl, and the alkoxy, aryloxy, cyano or haloaryl substituted derivatives thereof or:

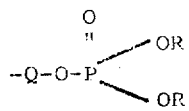

wherein Q represents vicinal carbon atoms of an alkylene radical containing from 2 to 20 carbon atoms, and R' is R or OR, with the proviso that at least one R in the above formula is a 2-haloalkyl radical, and a co-condensable phosphorus ester of the formula:

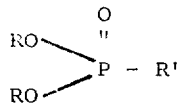

wherein R is 2-haloalkyl of 2 to 20 carbon atoms or alkyl of from 1 to 20 carbon atoms, aryl, aralkyl, alkaryl, alkenyl of from 2 to 20 carbon atoms, alkadienyl, alkynyl, cycloalkyl, cycloalkenyl, cycloalkadienyl, or aralkenyl, and the alkoxy, aryloxy, cyano or haloaryl substituted derivatives thereof or:

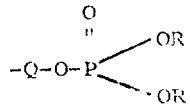

wherein Q is as defined above, and R' is R or OR said copolycondensation products being essentially free of five-membered phosphorus ester rings and being prepared by a process comprising heating to a temperature between about 110° and about 250°C. said phosphorus ester material, removing alkyl halide, forming:

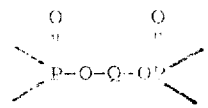

linkages wherein Q is as defined above and five-membered phosphorus ester rings, and converting said rings to open chain phosphorus esters by reaction at a temperature from about 20° to about 180°C. with a reagent of the formula:

YOH in which Y is hydrogen, alkyl of from 1 to 20 carbon atoms or alkyl of from 1 to 20 carbon atoms substituted with non-interfering substituents selected from the group consisting of aryloxy, halogen, alkoxy, alkenyl, aryl, acyl, acyloxy, hydroxyl, amido, alkylthio, arylthio, carbalkoxy, carboxamido, cyano or nitro.

9. Copolycondensation products according to claim 8 which are obtained by a process comprising the additional step of substantially neutralizing the acid structures by heating to a temperature from abouut 25° to about 225°C. the condensation product with an epoxide selected from the group consisting of $C_2$–$C_8$ alkylene oxides, epichlorohydrin, glycidol, epibromohydrin, styrene oxide, glycidyl ether cyclohexenylmethyl cyclohexene carboxylate diepoxide, butadiene diepoxide, vinyl cyclohexene diepoxide, 4,4,4-trichloro-1,2-epoxy butane or an ortho ester selected from the group consisting of radicals having the formula:

—C(OR)₃ wherein R is alkyl of from 1 to 6 carbon atoms.

10. Condensation products according to claim 2 in which the five membered phosphorus ester rings are opened by a reagent selected from the group consisting of water, monohydric alkanols having from 1 to 12 carbon atoms, allyl, alcohol, 2,3-dibromo propanol, tribromomoneopentyl alcohol, dibromoneopentylene glycol, ethylene glycol, dibromobutenediol, diethylene glycol, methoxyethanol, epoxyethanol, butoxyethanol, 2-chloroethanol, benzyl alcohol, glycerol, pentaerythritol, dipentaerythritol, trimethylolethane, trimethylolpropane, sorbitol, glucose, sucrose, lactose, methylglycoside, polyoxyethylated or polyoxypropylated derivatives of the polyols mentioned herein, acryloxyethanol, carbamyloxyethanol, acetoxyethanol, methacryloxyethanol, N-hydroxymethylacrylamide, vinyl hydroxyethyl ether, methylolmelamines, methylolureas and hydroxymethylphenols.

11. Condensation products as defined in claim 2 wherein one R is 2-chloroethyl, the other R is 2-chloroethyl or alkyl of from 1 to 4 carbon atoms and R' is OR, alkyl of from 1 to 4 carbon atoms or vinyl.

12. A homopolycondensation product according to claim 4 wherein the phosphorus ester is tris(2-chloroethyl) phosphate.

13. A homopolycondensation product according to claim 6 wherein the phosphorus ester is bis(2-chloroethyl) vinylphosphonate.

14. A copolycondensation product according to claim 9 wherein the phosphorus esters are tris(2-chloroethyl) phosphate and dimethyl methylphosphonate.

15. A copolycondensation product according to claim 9 wherein the phosphorus esters are bis(2- chloroethyl) vinylphosphonate and dimethyl methylphosphonate.

16. In a process for the preparation of phosphorus containing oligomers derived from the condensation of a phosphorus ester material comprising a phosphorus ester of the formula:

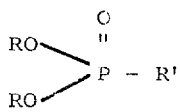

wherein R is 2-haloalkyl of 2 to 20 carbon atoms or alkyl of from 1 to 20 carbon atoms, aryl, aralkyl, alkaryl, alkenyl of from 2 to 20 carbon atoms, alkadienyl, alkynyl, cycloalkyl, cycloalkenyl, cycloalkadienyl, or aralkenyl, and the alkoxy, aryloxy, cyano or haloaryl substituted derivatives thereof or:

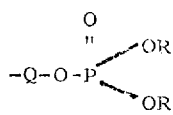

wherein Q represents vicinal carbon atoms of an alkylene radical containing from 2 to 20 carbon atoms, and R' is R or OR, wherein at least one R in the above formula is a 2-haloalkyl radical, resulting in the formation of five-membered phosphorus ester rings in said oligomers during condensation, the improvement comprising rendering said oligomers essentially free of said phosphorus ester rings by reacting at a temperature from about 20° to about 180°C. said oligomers with a reagent of the formula:

YOH in which Y is hydrogen, alkyl of from 1 to 20 carbon atoms or alkyl of from 1 to 20 carbon atoms substituted with non-interfering substituents selected from the group consisting of aryloxy, halogen, alkoxy, alkenyl, aryl, acyl, acyloxy, hydroxyl, amido, alkylthio, arylthio, carbalkoxy, carboxamido, cyano or nitro.

17. The process according to claim 16 comprising the additional step of substantially neutralizing the acid structures by heating to a temperature from about 25° to about 225°C. the oligomer with an epoxide selected from the group consisting of $C_2$-$C_8$ alkylene oxides, epichlorohydrin, glycidol, epibromohydrin, styrene oxide, glycidyl ether cyclohexenylmethyl cyclohexene carboxylate diepoxide, butadiene diepoxide, vinyl cyclohexene diepoxide, 4,4,4-trichloro-1,2-epoxy butane or an ortho ester selected from the group consisting of radicals having the formula:

—C(OR)$_3$ wherein R is alkyl of from 1 to 6 carbon atoms.

18. The process of claim 16 wherein the phosphorus ester is self-condensed.

19. The process of claim 17 wherein the phosphorus ester is self-condensed.

20. The process of claim 19 wherein the phosphorus ester is tris(2-chloroethyl)phosphate, the reagent is an alkanol having from 1 to 12 carbon atoms, followed by treatment with an epoxide in a quantity at least sufficient to neutralize the acid groups present.

21. The process of claim 20 wherein the epoxide is ethylene oxide.

22. The process of claim 20 wherein the epoxide is the diepoxide of cyclohexenylmethyl cyclohexenyl carboxylate.

23. The process of claim 22 wherein an excess of the diepoxide is employed, leaving the unreacted epoxy groups to substantially prevent further development of acidity upon storage.

24. In a process for the preparation of phosphorus containing oligomers derived from the condensation of a phosphorus ester material comprising a mixture of a phosphorus ester of the formula:

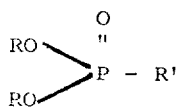

wherein R is 2-haloalkyl of 2 to 20 carbon atoms or alkyl of from 1 to 20 carbon atoms, aryl, aralkyl, alkaryl, alkenyl of from 2 to 20 carbon atoms, alkadienyl, alkynyl, cycloalkyl, cycloalkenyl, cycloalkadienyl, or aralkenyl, and the alkoxy, aryloxy, cyano or haloaryl substituted derivatives thereof or:

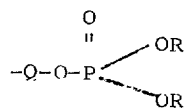

wherein Q represents vicinal carbon atoms of an alkylene radical containing from 2 to 20 carbon atoms, and R' is R or OR, with the proviso that at least one R in the above formula is a 2-haloalkyl radical, and a co-condensable phosphorus ester of the formula:

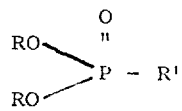

wherein R is 2-haloalkyl of 2 to 20 carbon atoms or alkyl of from 1 to 20 atoms; aryl, aralkyl, alkaryl, alkenyl of from 2 to 20 carbon atoms, alkadienyl, alkynyl, cycloalkyl, cycloalkenyl, cycloalkadienyl, or aralkenyl, and the alkoxy, aryloxy, cyano or haloaryl substituted derivatives thereof or:

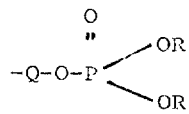

wherein Q is as defined above, and R' is R or OR, resulting in the formation of five membered phosphorus ester rings in said oligomers during condensation, the improvement comprising rendering said oligomers essentially free of said phosphorus ester rings by reacting at a temperature from about 20° to about 180°C. said oligomers with a reagent of the formula:

YOH in which Y is hydrogen, alkyl of from 1 to 20 carbon atoms or alkyl of from 1 to 20 carbon atoms substituted with non-interfering substituents selected from the group consisting of aryloxy, halogen, alkoxy, alkenyl, aryl, acyl, acyloxy, hydroxyl, amido, alkylthio, arylthio, carbalkoxy, carboxyamido, cyano or nitro.

25. The process according to claim 24 comprising the additional step of substantially neutralizing the acid structures by heating the oligomer with an epoxide selected from the group consisting of $C_2$–$C_8$ alkylene oxides, epichlorohydrin, glycidol, epibromohydrin, styrene oxide, glycidyl ether cyclohexenylmethyl cyclohexene carboxylate diepoxide, butadiene diepoxide, vinyl cyclohexene diepoxide, 4,4,4-trichloro-1,2-epoxy butane or an ortho ester selected from the group consisting of radicals of the formula:

$$-C(OR)_3$$

wherein R is alkyl of from 1 to 6 carbon atoms.

26. The process of claim 25 wherein the phosphorus esters are bis(2-chloroethyl)vinylphosphonate and dimethyl methylphosphonate, the reagent is an alkanol having from 1 to 20 carbon atoms, followed by treatment with an epoxide.

27. The process of claim 26 wherein the reagent is methanol and the epoxide is ethylene oxide.

28. The process of claim 25 wherein the reagent is 2,3-dibromopropanol and the epoxide is ethylene oxide.

29. The process of claim 25 wherein the reagent is dibromoneopentylene glycol and the epoxide is ethylene oxide.

30. The process of claim 25 wherein the phosphorus esters are tris(2-chloroethyl)phosphate and dimethyl methylphosphonate.

31. The process of claim 30 wherein the epoxide is ethylene oxide.

32. The process of claim 30 wherein the epoxide is the diepoxide of cyclohexenylmethyl cyclohexene carboxylate.

33. The process of claim 32 wherein an excess of the diepoxide is employed, leaving the unreacted epoxy groups to substantially prevent further development of acidity upon storage.

34. In a process for rendering neutral and hydrolytically stable, an oligomeric phosphorus ester containing as an unstable component, a five-membered phosphorus ester ring, the step which comprises reacting at a temperature from about 20° to about 180°C. said phosphorus ester with a reagent of the formula:

$$YOH$$

in which Y is hydrogen, alkyl of from 1 to 20 carbon atoms or alkyl of from 1 to 20 carbon atoms substituted with non-interfering substituents selected from the group consisting of aryloxy, halogen, alkoxy, alkenyl, aryl, acyl, acyloxy, hydroxyl, amido, alkylthio, arylthio, carbalkoxy, carboxamido, cyano or nitro, said reagent being added in an amount at least equivalent to the five-membered phosphorus ester ring content, and allowing the reaction to proceed until substantially all of the five-membered rings are opened.

* * * * *